United States Patent [19]
Taniguchi et al.

[11] Patent Number: 5,905,926
[45] Date of Patent: May 18, 1999

[54] POSITIONING STRUCTURE FOR BRAKE FORCE SUPPLIER FOR USE IN IMAGE FORMING APPARATUS

[75] Inventors: Susumu Taniguchi; Hideaki Kimata; Hiroyuki Arima; Keiji Ban; Masayuki Mizuno; Katsuhide Yamaguchi; Makoto Eki, all of Osaka, Japan

[73] Assignee: Mita Industrial Co., Ltd., Osaka-fu, Japan

[21] Appl. No.: 08/966,504

[22] Filed: Nov. 10, 1997

[30] Foreign Application Priority Data

Nov. 15, 1996 [JP] Japan .................................. 8-305289

[51] Int. Cl.⁶ .................................................. G03G 15/00
[52] U.S. Cl. ........................... 399/125; 399/107; 399/110
[58] Field of Search ..................... 399/125, 107, 399/110, 210; 355/75; 347/108, 152, 222, 263

[56] References Cited

U.S. PATENT DOCUMENTS

| | | | |
|---|---|---|---|
| 4,166,692 | 9/1979 | Okada et al. | 399/107 |
| 4,748,481 | 5/1988 | Kunihiro | 355/133 |
| 4,941,015 | 7/1990 | Komai et al. | 399/107 |
| 4,969,010 | 11/1990 | Tamura et al. | 355/75 |
| 5,162,846 | 11/1992 | Cahill | 399/125 |
| 5,285,240 | 2/1994 | Kinoshita et al. | 399/110 |
| 5,418,601 | 5/1995 | Fujisawa et al. | 399/125 |
| 5,587,769 | 12/1996 | Sawada et al. | 399/113 |
| 5,737,667 | 4/1998 | Okuda et al. | 399/107 X |

FOREIGN PATENT DOCUMENTS

| | | |
|---|---|---|
| 56-025750 | 3/1981 | Japan . |
| 3-120142 | 5/1991 | Japan . |
| 4-063360 | 2/1992 | Japan . |
| 7-054536 | 2/1995 | Japan . |
| 9-018626 | 1/1997 | Japan . |

*Primary Examiner*—Matthew S. Smith
*Attorney, Agent, or Firm*—Jordan and Hamburg LLP

[57] ABSTRACT

An image forming apparatus of this invention is constructed such that a main base frame constituting the apparatus is formed with a pair of first positioning pins. An attachment member is formed with a pair of second positioning pins and positioning holes for fittingly receiving the first positioning pins therein to position the attachment member relative to the main base frame. A brake force supplier formed with mounting holes is attached to the attachment member while positioned relative thereto by fitting insertion of the second positioning pins in the mounting holes. When the attachment member is not used, another brake force supplier can be directly mounted on the main base frame and positioned relative thereto by fitting insertion of the first positioning pins in mounting holes of the brake force supplier.

12 Claims, 10 Drawing Sheets

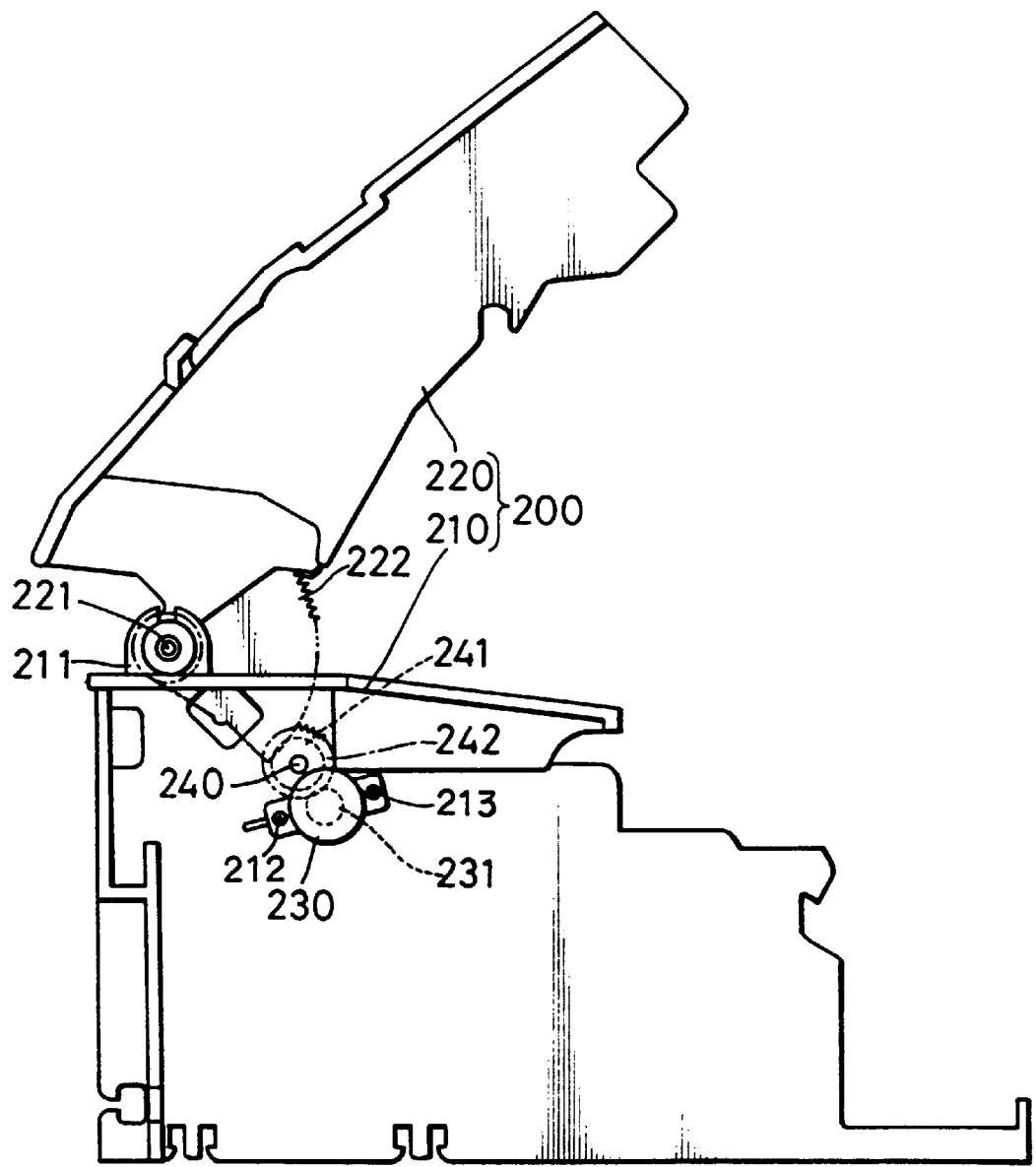

POSITIONING STRUCTURE FOR BRAKE FORCE SUPPLIER FOR USE IN IMAGE FORMING APPARATUS

BACKGROUND OF THE INVENTION

1. Field of the Invention

This invention relates to a positioning structure for a brake force supplier for use in an image forming apparatus, such as a copying machine, a facsimile machine, a printer, and a compound machine having combined functions of these machines, which comprises a main base frame, an upper frame openably mounted on the main base frame, and the brake force supplier for applying a brake force to the upper frame during a closing operation thereof.

2. Description of the Background Art

There has been known an image forming apparatus shown in FIG. 10 having a frame structure 200 constructed in the following manner. The frame structure 200 has a main base frame 210 internally provided with various parts such as an imaging unit including a photoreceptor, and an upper frame 220 on which an operating unit including ten key switches and a start button is arranged. In such conventional image forming apparatus having the above frame structure 200, a shaft 221 provided at the rear end of the upper frame 220 is fittingly inserted in bearing portions 211 (only one bearing portion is shown in FIG. 10) provided at the upper rear end of the main base frame 210 to render the upper frame 220 openable (rotatable) with respect to the main base frame 210.

The upper frame 220 is further provided with a pivotal movement transmitter (gear) 222 which is pivotally movable about an axis of the shaft 221 on the inside of the main base frame 210 in association with a rotation (opening/closing) of the upper frame 220. On the outer surface of a side wall of the main base frame 210, there is mounted a brake force supplier 230 in the form such as a gear damper and a torque limiter via positioning pins 212 and 213 that are projected on the side wall of the main base frame 210.

The brake force supplier 230 includes a driven gear 231. The driven gear 231 is driven in accordance with a rotation of the gear 222 via idle gears 241 and 242 that are integrally mounted on a common shaft 240.

With the above image forming apparatus, an operator sets the apparatus in an opened state by pivotally moving the upper frame 220 upward to perform a certain operation such as removal of a jammed sheet. When the operator is on the way of setting the apparatus in a closed state after the certain operation, the brake force supplier 230 applies a certain brake force to the upper frame 220 to reduce the closing speed of the upper frame 220. With this arrangement, there has been eliminated a possibility that a great impact force generates when the upper frame 220 comes into contact with the main base frame 210 at a final stage of closing.

The above image forming apparatus provided with the brake force supplier has recently suffered from the following problem. Specifically, the apparatus of recent model is loaded with an automatic document-feeder unit of a relatively heavy weight on the upper frame 220 to stack a number of original documents and to automatically feed the documents one by one. Accordingly, the total weight of the upper frame side becomes fairly heavy, causing that the conventional brake force supplier 230 cannot apply a brake force great enough to reduce the closing speed of the upper frame 220 to a desirable level.

To desirably reduce the closing speed of the upper frame 220 to cope with the heavy weight of the upper frame side, there has been proposed an idea of mounting a brake force supplier having a greater brake force. However, to meet a change in the brake force, the dimensions of the brake force supplier need changes (e.g., diameter of the main body or a number of gear teeth of the drive gear), and these changes in some cases require a change in a pitch of mounting holes formed in the opposite ends of the brake force supplier to receive the positioning pins 212 and 213. Accordingly, in mounting a brake force supplier having a greater brake force in place of the brake force supplier 230, the position of the pins 212 and 213 need to be adjusted in accordance with the pitch of the mounting holes of the newly mounted brake force supplier.

SUMMARY OF THE INVENTION

In view of the above drawbacks of the prior art, an object of this invention is to provide a positioning structure for a brake force supplier for use in an image forming apparatus that enables mounting of a brake force supplier having a different brake force on the same main base frame.

To accomplish the above objects, this invention is directed to a positioning structure for positioning a brake force supplier relative to a main base frame of an image forming apparatus having the main base frame, an upper frame openably mounted on the main base frame, and the brake force supplier for applying a brake force to the upper frame during a closing operation thereof. The positioning structure comprises an attachment member positioned on the main base frame by first positioning members formed on the main base frame, the attachment member formed with second positioning members; and the brake force supplier positioned on the attachment member by the second positioning members.

With the above arrangement, the attachment member is positioned relative to the main base frame by the first positioning members, and the brake force supplier is positioned relative to the attachment member by the second positioning members.

Accordingly, the brake force supplier is attached to the main base frame via the attachment member, and a rotation of a pivotal movement transmitter (gear) provided on the upper frame side is transmitted to a driven gear of the brake force supplier. This arrangement realizes secure application of a brake force of the brake force supplier to the upper frame during a closing operation thereof to reduce the closing speed of the upper frame to a certain desirable level.

It should be noted that another brake force supplier having a brake force different from the above brake force supplier can be directly mounted on the main base frame of the image forming apparatus by the first positioning members of the main base frame, without mounting the attachment member.

The above and other objects, features and advantages of the present invention will become more apparent upon a reading of the following detailed description and drawings.

BRIEF DESCRIPTION OF THE DRAWINGS

FIG. 10 is a side view of a frame structure of an image forming apparatus of prior art where a brake force supplier is directly mounted on a main base frame of the apparatus.

DETAILED DESCRIPTION OF THE PREFERRED EMBODIMENTS OF THE INVENTION

Hereinafter, an arrangement of various parts constituting an image forming apparatus incorporated with a positioning structure for a brake force supplier of this invention is briefly described first, and then, the positioning structure in detail.

Figure 1:
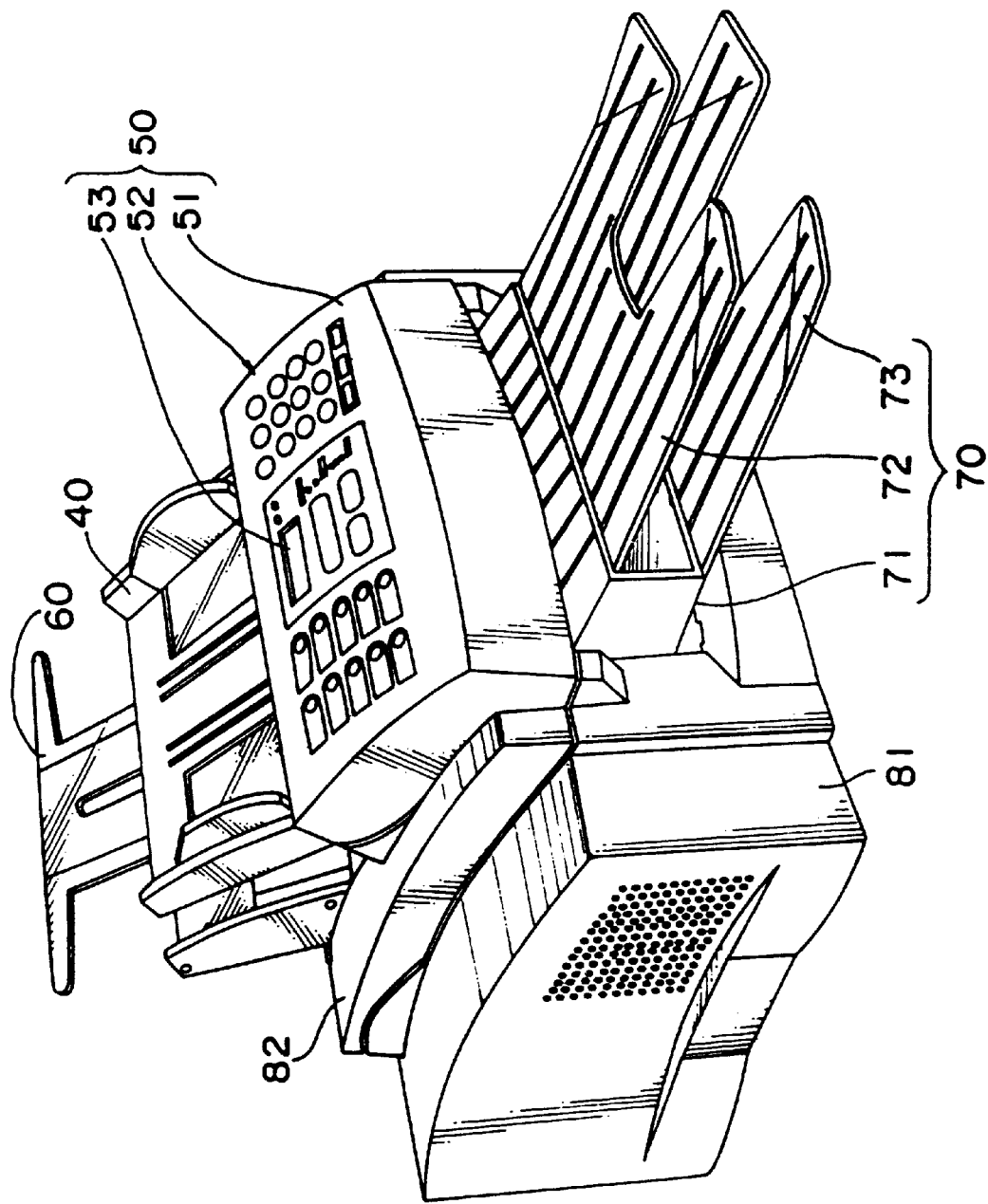
FIG. 1 is a perspective view of an external appearance of an embodiment of an image forming apparatus incorporated with a positioning structure for a brake force supplier of this invention.
Figure 2:
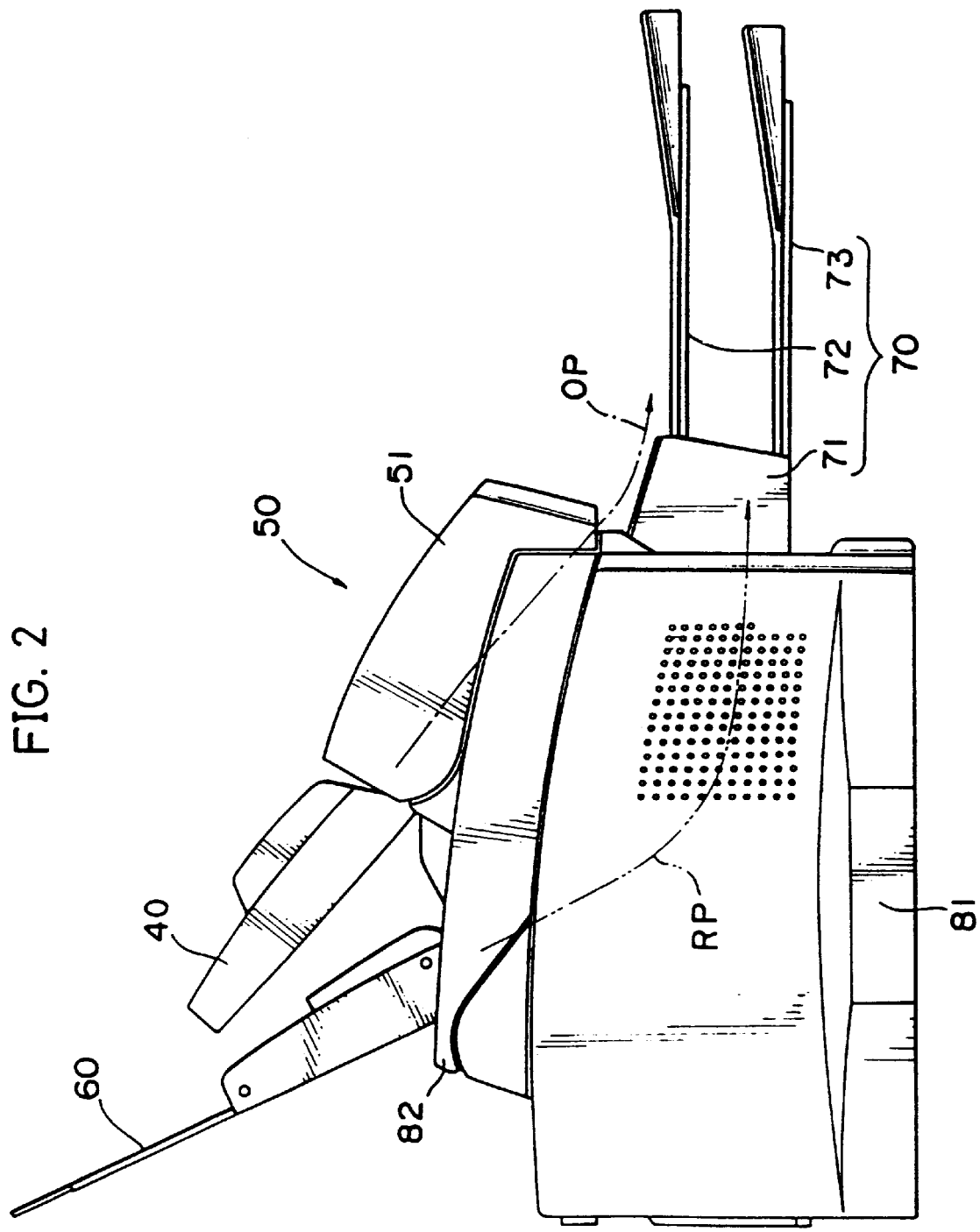
FIG. 2 is a side view of the image forming apparatus.

FIG. 1 is a perspective view of an external appearance of the image forming apparatus incorporated with the positioning structure for a brake force supplier embodying this invention, and FIG. 2 is a side view of the apparatus. The image forming apparatus in this embodiment is a compound machine having functions as a facsimile machine and a copying machine.

Figure 3:
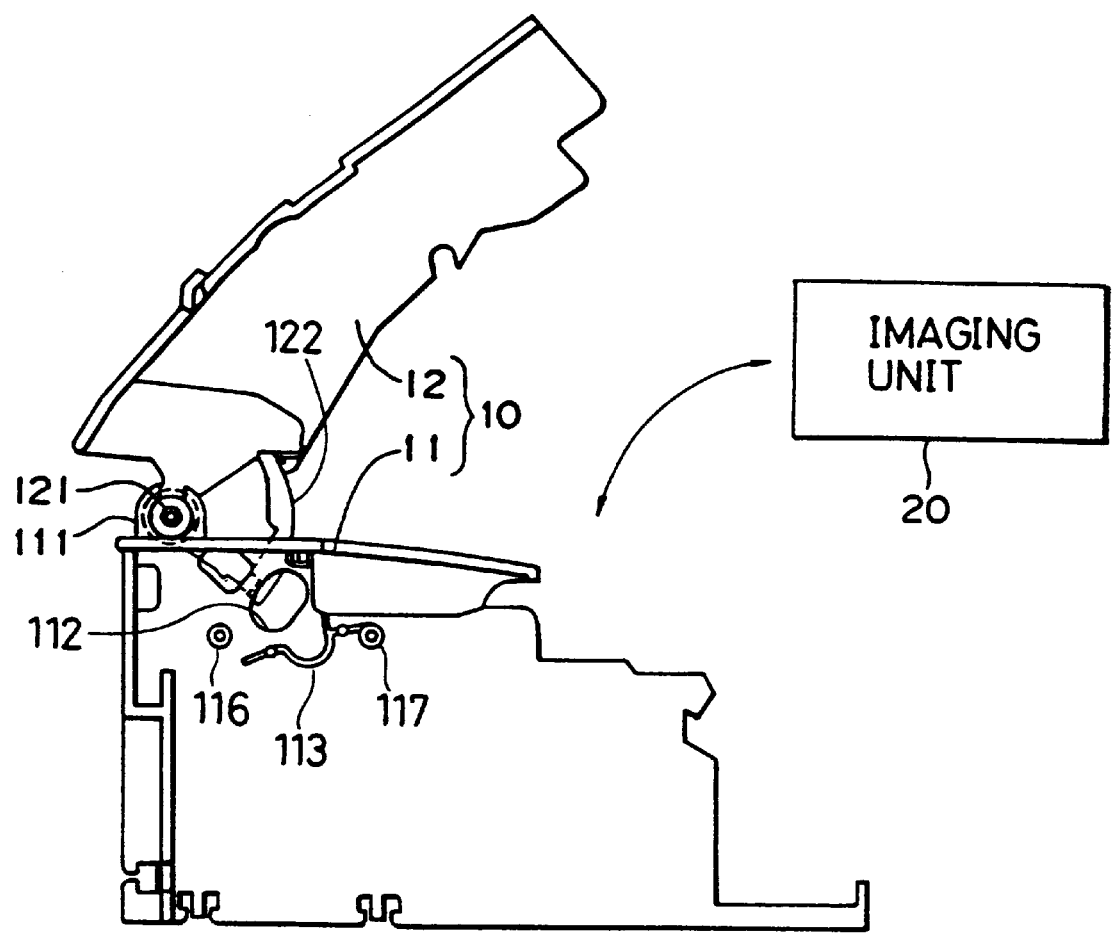
FIG. 3 is a side view of a frame structure of the image forming apparatus.

As shown in FIG. 3, the image forming apparatus has a frame body 10 consisting of a main base frame 11 located on the lower portion and an upper frame 12 located on the upper portion of the apparatus. The frame body 10 is provided with a pair of bearing portions 111 on the main base frame 11, at lateral ends orthogonal to the plane in FIG. 3 on the rear side (left side in FIG. 3) of the apparatus. The bearing portions 111 are oriented upward (only one bearing portion is shown in FIG. 3). A shaft 121 extending in a direction orthogonal to the plane in FIG. 3 is inserted in the bearing portions 111 and 111 to render the upper frame 12 pivotable about an axis thereof.

More specifically, the apparatus in this embodiment is of a so-called shell type such that the upper frame 12 swings around the axis of the shaft 121 to open and close relative to the main base frame 11. The shell type apparatus is constructed such that an operator can accommodate an imaging unit 20 with a photoreceptor inside the main base frame 11 or take out the accommodated imaging unit 20 through an opening defined on the upper front side (upper right side in FIG. 3) of the apparatus by opening up the upper frame 12. Further, this arrangement makes it easier to remove jammed recording paper inside the apparatus.

The imaging unit 20 has a conventional arrangement except that it is detachably mounted inside the main base frame 11. Specifically, as will be described later, an image read by a contact type image scanner 33 or an image transmitted from a facsimile machine (external device) is exposed on the photoreceptor to form an electrostatic latent image, which in turn is developed into a toner image by a developing unit provided along a periphery of the photoreceptor. Then, the toner image is transferred by a transfer roller onto recording paper (cut sheet) transported from a recording paper insertion tray which is to be described later.

Figure 4:
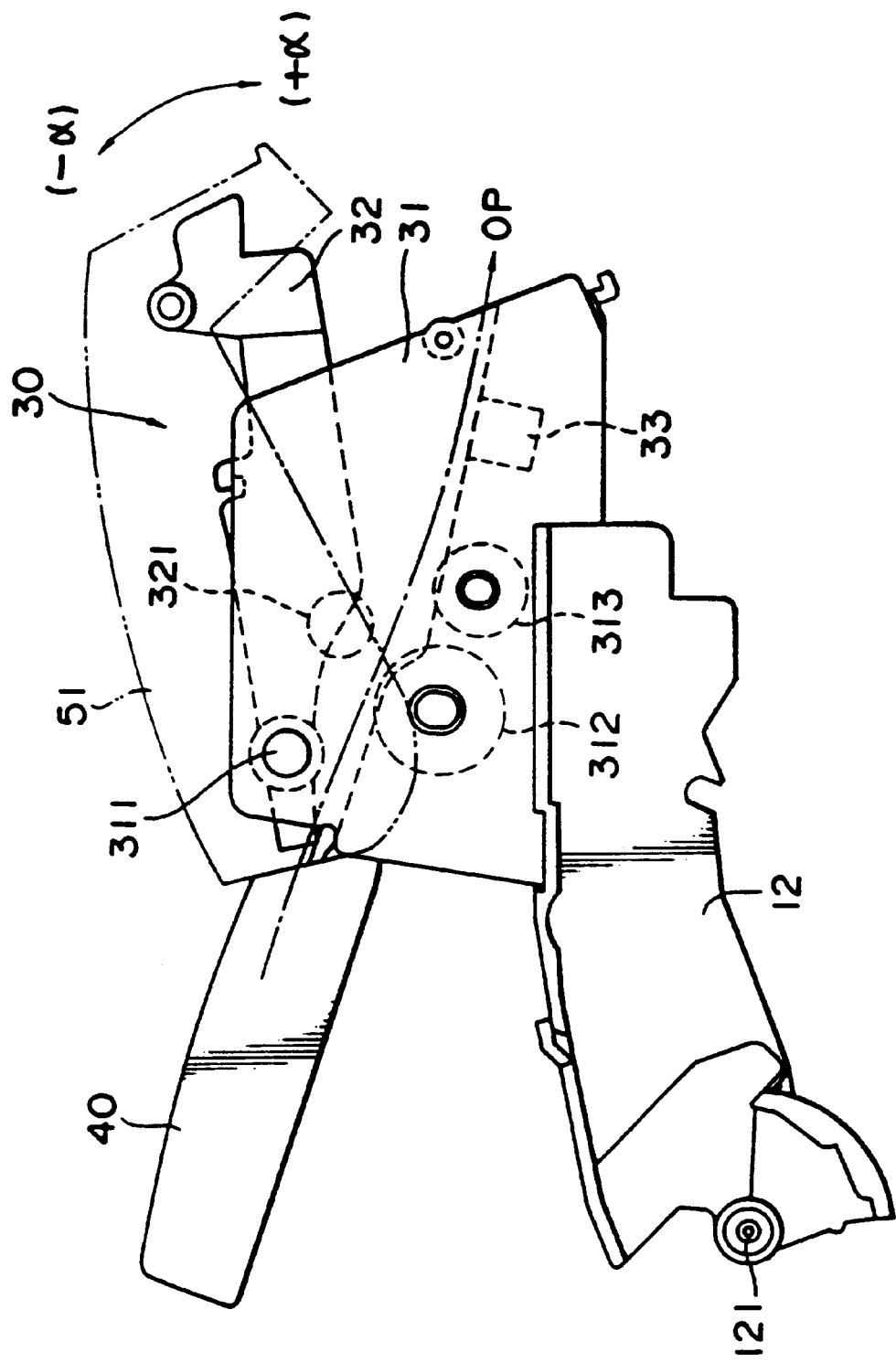
FIG. 4 is a side view of essential parts of the image forming apparatus showing a state where an automatic document feeder unit is mounted on an upper frame of the apparatus.

As shown in FIG. 4, an automatic document feeder unit 30 is mounted on the upper frame 12. The automatic document feeder unit 30 is operated to automatically feed a stack of original documents placed thereon one by one while causing the contact type image scanner 33 to successively read an image of the original documents.

The automatic document feeder unit 30 has a housing member 31 which is directly mounted on the upper frame 12 to feed documents, and a document feed guide member (hereinafter also merely referred to as "guide member") 32 which is connected to an end portion 311 provided on the rear end (left side in FIG. 4) of the housing member 31 and is pivotable around an axis of the end portion 311 in the direction of ($-\alpha$) and ($+\alpha$).

Generally, the guide member 32 swings in the ($+\alpha$) direction by its own weight to the housing member 31 in close contact state. In this state, when document feed rollers 312 and 313 disposed on the upper side of the housing member 31, and a document feed roller 321 disposed on the lower side of the guide member 32 are rotated, a stack of original documents set on a document insertion tray 40 are fed one by one in a state that each document is nipped between the rollers 321 and 312, and the rollers 321 and 313. Thus, the documents are fed one by one toward the front side (right side in FIG. 4) of the apparatus along an original document feed path OP shown by chain line with one dot in FIG. 4.

In this embodiment, the document feed rollers 312, 313, and 321 are all driven to rotate. Alternatively, at least one of these rollers 312, 313, and 321 may be driven, while the other two rollers are allowed to follow the rotation of the drive roller to thereby feed the documents.

The contact type image sensor 33 is mounted on the upper front side of the housing member 31. The image sensor 33 extends in a direction perpendicular to the plane of FIG. 4, and reads the image of a document fed by the document feeder unit 30 line after line. When the document passes the image sensor 33, the entire image of the document is read.

Referring back to FIGS. 1 and 2, in this embodiment, an operation cover 51 is provided to cover the automatic document feeder unit 30 from above. On the upper surface of the operation cover 51, there are arranged various switches 52 such as ten key switches and a start button, and a display portion 53 for displaying the telephone number for facsimile transmission/receiving and the operating status of the apparatus. The operation cover 51, the switches 52, and the display portion 53 constitute the operation unit 50.

With this arrangement, an operator performs facsimile and copying operation by pressing buttons of the operation unit 50 according to needs, and also confirms the operating status through contents displayed on the display portion 53.

Referring to FIG. 3, on the rear side of the upper frame 12, there is arranged a recording paper insertion tray 60 for setting a stack of recording paper (cut sheets). A stack of recording paper set on the recording paper insertion tray 60 are transported one by one along a recording paper transport path RP shown by chain line with two dots in FIG. 2. Specifically, recording paper is transported inside the apparatus along the transport path RP, has an image recorded on the recording paper by the imaging unit 20 based on an image read by the image scanner 33 or based on an image data transmitted from the external device, and then is discharged toward the front side of the apparatus.

In this way, the original documents after the image reading and the recording paper after the image recording are discharged toward the front side of the apparatus and received onto a tray unit 70 which is attached to the front side of the main base frame 11.

As shown in FIG. 2, the tray unit 70 includes a tray frame 71 detachably attached to the main base frame 11, and trays 72 and 73 both of which are detachably inserted in the tray frame 71 and are vertically spaced apart by a certain distance. In this embodiment, the upper tray 72 is used as a document discharge tray for discharging original documents, while the lower tray 73 is used as a recording paper discharge tray for discharging recording paper.

Covers 81 and 82 are attached to the frame body 10 from outside to protect the internal parts of the apparatus.

Figure 5A:
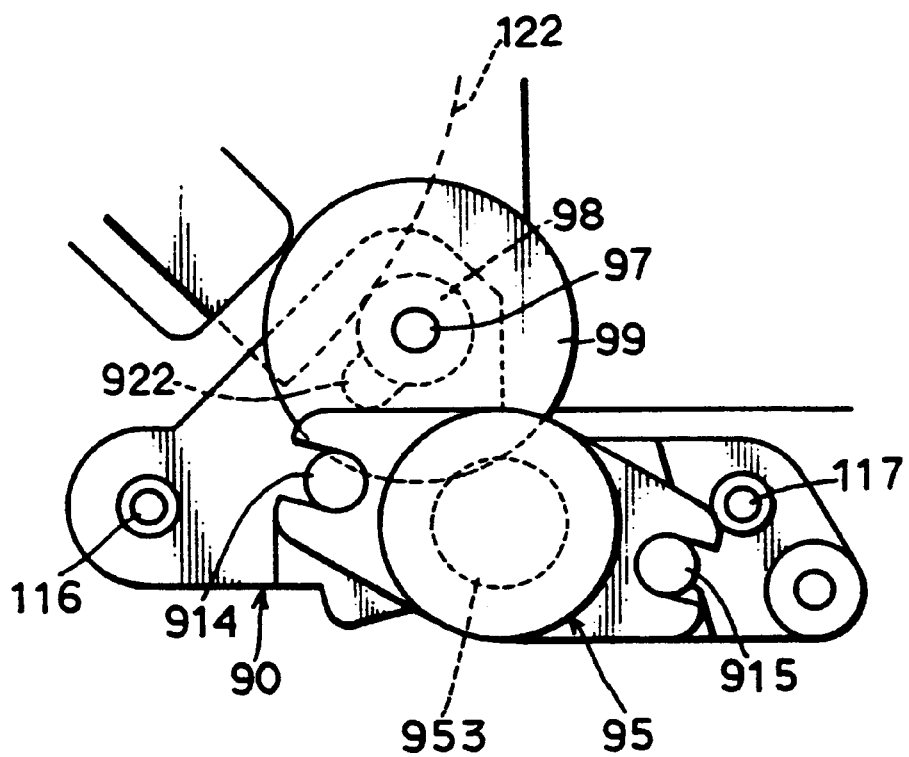
FIG. 5A is a side view of the brake force supplier and its peripheral parts showing a state where the brake force supplier is mounted on a main base frame of the apparatus.
Figure 5B:
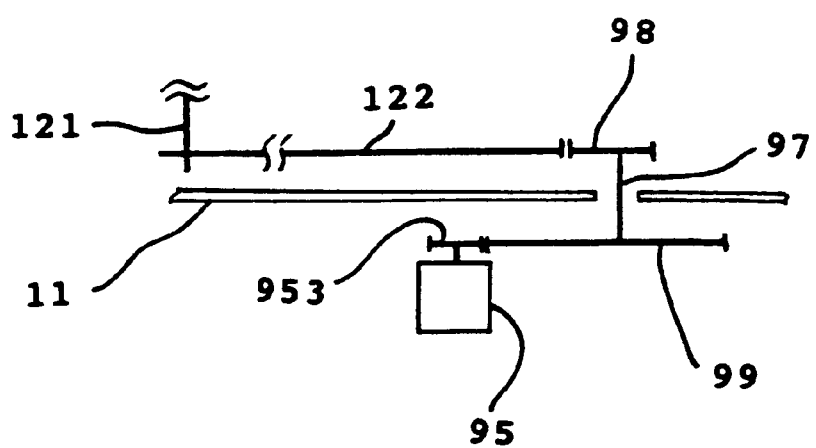
FIG. 5B is a gear train diagram showing a series of gears in mesh around the brake force supplier.
Figure 6:
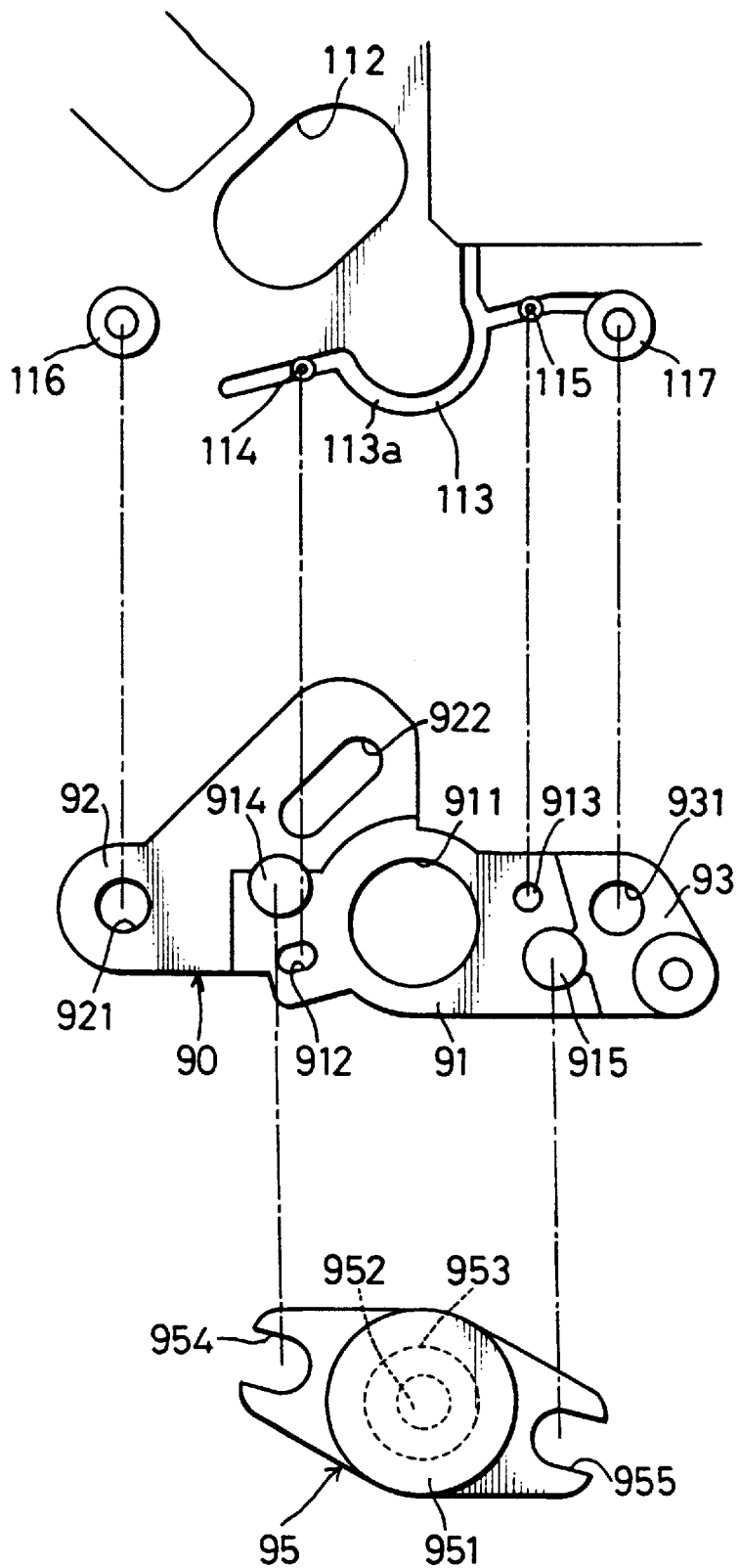
FIG. 6 is an exploded view showing an operation as to how the brake force supplier and its peripheral parts are to be mounted on the main base frame of the apparatus.

Next, the positioning structure for a brake force supplier for use in the image forming apparatus having the above construction is described with reference to FIGS. 3, 5, and 6. FIG. 3 is a side view of the image forming apparatus without mounting the brake force supplier 95 to clearly show the arrangement of the main base frame 11. FIG. 5 is a diagram showing a state that the brake force supplier 95 and its peripheral parts are attached to the main base frame 11, and FIG. 6 is an exploded view of the brake force supplier 95 and its peripheral parts showing an operation as to how these members are to be mounted on the main base frame 11.

More specifically, as shown in FIG. 3, the upper frame 12 is provided with a fan-like gear (pivotal movement transmitter) 122 that is rotatable about the pivotal axis of the shaft 121. Specifically, the gear 122 rotates inside of the main base frame 11 in association with the opening/closing of the upper frame 12 about the pivotal axis of the shaft 121.

A side wall of the main base frame 11 is formed with a through hole 112 showing part of a tooth portion formed along a circumference of the gear 122. A U-shaped mounting member (or receiving member) 113 is provided on the lower and front side (right side in FIG. 3) of the through hole 112 in the apparatus to mount the brake force supplier 95 such as a gear damper and a torque limiter thereon.

More specifically, the mounting member 113 has an arc portion 113a in the middle thereof, and a pair of positioning pins 114 and 115 at opposite ends of the arc portion 113a. The pins 114 and 115 project outward by a certain length to enable stable mounting of the brake force supplier 95 at an appropriate position. A pair of bosses 116 and 117 are formed at an appropriate position on the outer surface of the side wall of the main base frame 11, at opposite ends of the mounting member 113 in such a manner that the bosses 116 and 117 project outward to fixedly mount an attachment member 90.

The attachment member 90 has a main body (or a main body portion) 91 to mount the brake force supplier 95 in an intermediate portion thereof, and end portions (attachment portions) 92 and 93 that are integrally formed with the main body 91 at opposite ends of the main body 91. The main body 91 is formed with a through hole 911 in the middle thereof, and is further formed with a pair of positioning holes 912 and 913 and a pair of positioning pins 914 and 915 at an appropriate position.

The positioning holes 912 and 913 are adapted for positioning the attachment member 90 relative to the main base frame 11, whereas the positioning pins 914 and 915 are adapted for positioning the brake force supplier 95 relative to the attachment member 90 (and fixing the same thereat).

The holes 912 and 913 and the pins 914 and 915 oppose to each other with the through hole 911 intervening therebetween respectively, and a line connecting the holes 912 and 913 and a line connecting the pins 914 and 915 intersect at a certain point (i.e., set in a non-parallel state).

More specifically, the above intersecting point substantially coincides with the center of the through hole 911 and with the center of rotational axis of a driven gear 953 of the brake force supplier 95 which is described later.

The attachment portion 92 is formed with a fixing hole 921 at a specified position and with a through hole 922 at a position corresponding to the through hole 112 of the main base frame 11. The attachment portion 93 is formed with a fixing hole 931 at a specified positions The attachment member 90 is constructed such that the positioning holes 912 and 913 fittingly receive the pins 114 and 115 of the mounting member 113 to position the attachment member 90 relative to the main base frame 11, while fixing the attachment member 90 on the main base frame 11 by fitting insertion of the bosses 116 and 117 in the fixing holes 921 and 931 formed in the attachment portions 92 and 93 and fastening the top of the bosses 116 and 117 in the inserted state with fastening means such as a screw or nut (fastening state of the top portion of the boss is not shown in FIG.5A).

The brake force supplier 95 includes a so-called gear damper and a torque limiter. In this embodiment, the brake force supplier 95 comprises a main body 951, a shaft 952, and the driven gear 953 linked to the main body 951 via the shaft 952. The brake force supplier 95 is further formed with a pair of cutaways (recesses or holes) 954 and 955 at opposite ends thereof.

The brake force supplier 95 is so constructed as to apply a greater brake force to the upper frame 12 during a closing operation thereof, compared to the brake force supplier 230 of prior art shown in FIG. 10. The driven gear 953 is arranged on the main base frame side, i.e., disposed between the main body 951 and the main base frame 11 as shown in FIG.5B. The pair of cutaways 954 and 955 are formed in the brake force supplier 95 to position the brake force supplier 95 relative to the attachment member 90 by inserting the pins 914 and 915 of the attachment member 90 in the cutaways 954 and 955 of the brake force supplier 95 respectively. The attachment member 90 carrying the brake force supplier 95 in the above manner is mounted on the main base frame 11.

The brake force supplier 95 has its position fixed on the attachment member 90 by welding or cauking the top portion of the pins 914 and 915 that have been inserted in the cutaways 954 and 955.

Similar to the brake force supplier 230, the brake force supplier 95 is so constructed as not to rotate the shaft 952 unless a torque beyond a certain value is applied to the driven gear 953.

The attachment member 90 carrying the brake force supplier 95 is fixed on the main base frame 11 by engagement of the bosses 116 and 117 in the fixing holes 921 and 931. With the brake force supplier 95 mounted on the main base frame 11 via the attachment member 90, the pivotal movement of the gear 122 provided on the upper frame side is transmitted to the driven gear 953 of the brake force supplier 95 via the pair of idle gears 98 and 99 that are concentrically rotatably mounted on the common shaft 97 (see FIG. 5B).

More specifically, the shaft 97 passes through the through hole 112 of the main base frame 11 and the through hole 922 of the attachment member 90. The idle gear 98 mounted on the shaft 97 on the inside of the main base frame 11 meshes with the gear 122, and the idle gear 99 mounted on the same shaft 97 on the outside of the main base frame 11 meshes with the driven gear 953 (see FIG. 5B). With this arrangement, a certain (great) brake force is applied to the upper frame 12 carrying the automatic document feeder unit 30 when the upper frame 12 is being closed. Accordingly, there can be assuredly eliminated a possibility that a great impact force generates when the upper frame 12 is about to come into contact with the main base frame 11 at a final stage of closing operation.

To sum it all up, the position structure for a brake force supplier for use in an image forming apparatus of this invention is constructed such that the brake force supplier 95 is mountable on the main base frame 11 via the attachment member 90. Thereby, in this embodiment, the main base frame 11 is replaceably mountable with at least two kinds of brake force supplier each having a different brake force.

Figure 7:
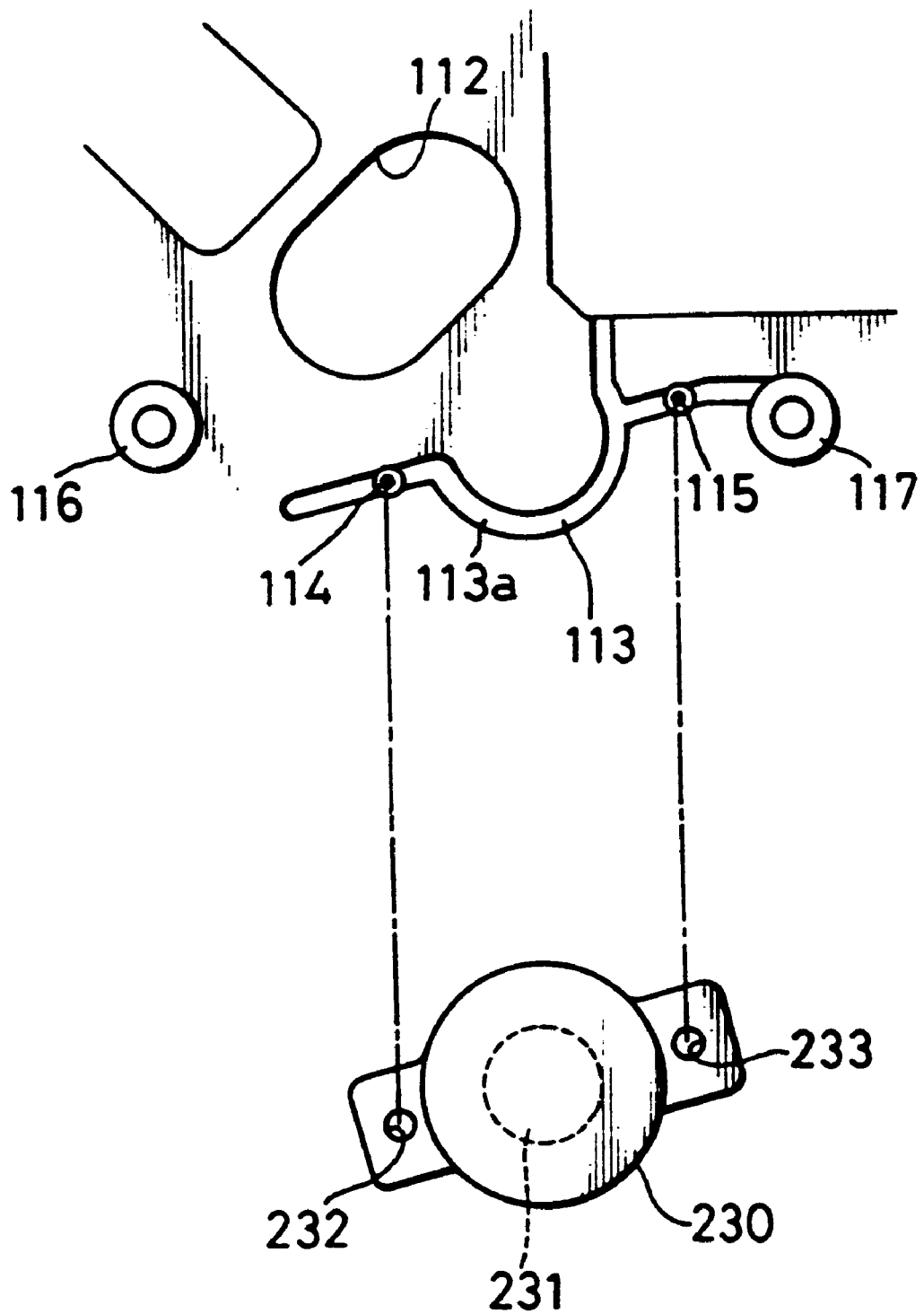
FIG. 7 is an exploded view showing an operation as to how a brake force supplier is to be directly mounted on the main base frame.

More specifically, in the case where the brake force supplier 230 (see FIG. 10) having a relatively small brake force is to be mounted, as shown in FIG. 7, the brake force supplier 230 is directly mounted on the main base frame 11 in the following manner. The brake force supplier 230 is set on the mounting member 113 in a state that the driven gear 231 is disposed between the main base frame 11 and the brake force supplier 230 and the positioning pins 114 and 115 are inserted in the mounting holes 232 and 233 of the brake force supplier 230 to position and fix the brake force supplier on the main base frame 11.

On the other hand, in the case where the brake force supplier 95 having a relative large brake force is to be mounted on the main base frame 11, the brake force supplier 95 is indirectly mounted on the main base frame 11 via the attachment member 90. In this way, the brake force suppliers 230 and 95 having a brake force different from each other can be mounted on the same main base frame 11.

In the former case of direct mounting of the brake force supplier 230 on the main base frame 11, the brake force supplier 230 is directly positioned relative to the main base frame 11 via the positioning pins 114 and 115. Thus, the pivotal movement of the gear 122 mounted on the upper frame side is transmitted to the driven gear 231 of the brake force supplier 230.

In the latter case of indirect mounting of the brake force supplier 95 on the main base frame 11, the brake force supplier 95 is positioned relative to the attachment member 90 via insertion of the pins 914 and 915 of the attachment member 90 in the cutaways 954 and 955 of the brake force supplier 95, and the attachment member 90 carrying the brake force supplier 95 is positioned relative to the main base frame 11 via insertion of the pins 114 and 115 of the main base frame 11 into the holes 912 and 913 of the attachment member 90. In this case, also, the pivotal movement of the gear 122 is transmitted to the driven gear 953 of the brake force supplier 95.

In the above embodiment, the attachment member 90 is provided with the pair of positioning pins 914 and 915 to position the brake force supplier 95 relative thereto. However, the number of pin is not limited to the above, and more than one pair may be arranged on the main body 91 with the distance between each pair varied to enable mounting of various kinds of brake force supplier each having a different brake force. In this way, merely providing the one attachment member can realize mounting of various kinds of brake force suppliers each having a different brake force.

Alternatively, a plural different kinds of attachment members each having the distance between the positioning pins 914 and 915 varied in accordance with change of the brake force may be prepared, and the attachment member suitable for a brake force supplier having a brake force of a required level may be selected. In this altered form, merely selecting the suitable attachment member can meet different required levels of brake force without the need of replacing the main base frame.

Figure 8:
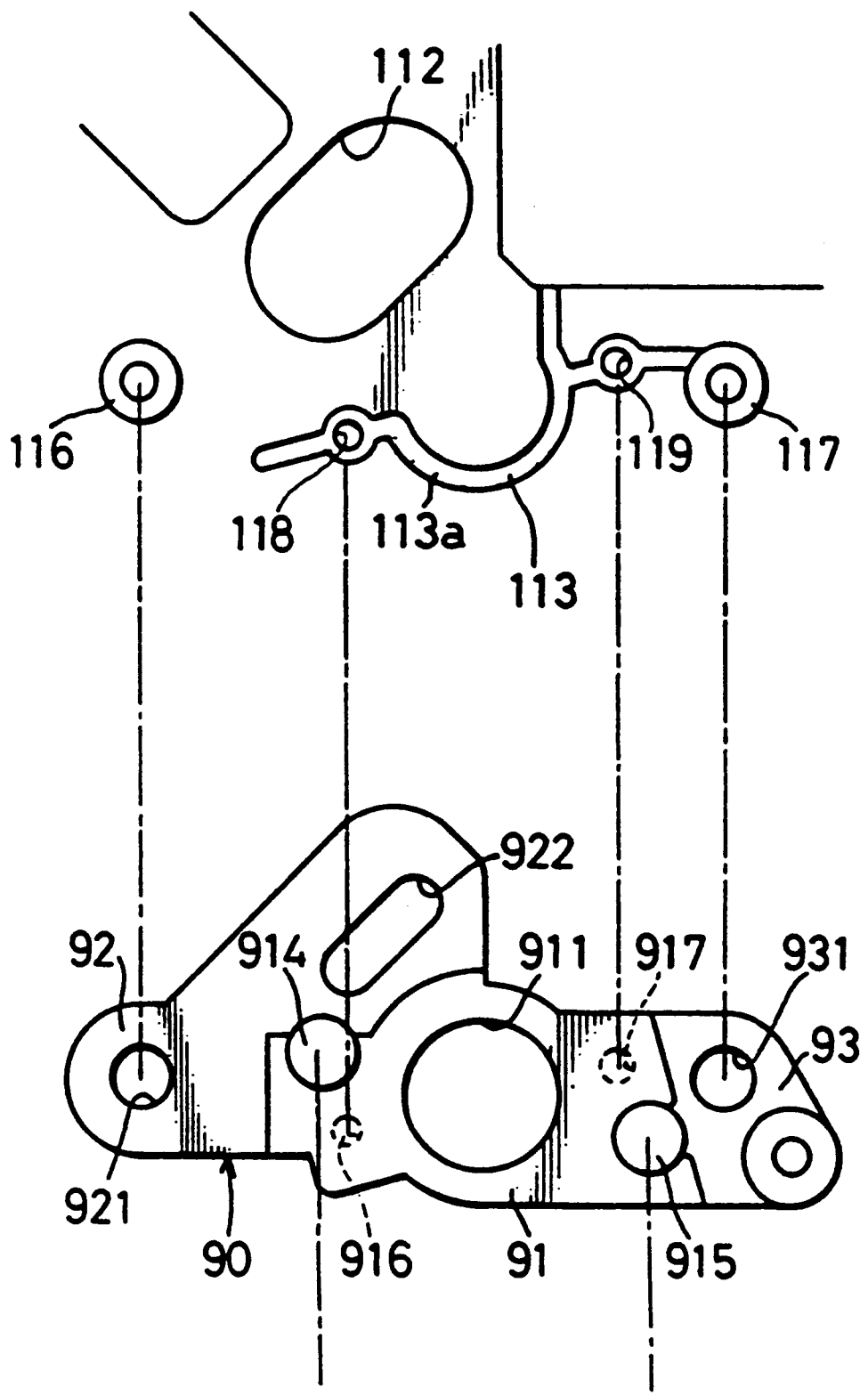
FIG. 8 is a diagram showing a modification of the positioning structure of mounting the attachment on the main base frame.

In the above embodiment, the positioning pins 114 and 115 provided on the mounting member 113 that is attached to the main base frame 11 are fitted in the corresponding holes 912 and 913 formed in the attachment member 90 to position the attachment member 90 relative to the main base frame 11. Alternatively, as shown in FIG. 8, a pair of through holes 118 and 119 may be formed in the mounting member 113, and a pair of positioning pins 916 and 917 may be arranged on the backside of the main body 91 of the attachment member 90 at an appropriate position corresponding to the through holes 118 and 119. The positioning pins 916 and 917 project toward the main base frame 11.

With this arrangement, the attachment member 90 can be positioned relative to the main base frame 11 by fitting insertion of the pins 916 and 917 in the through holes 118 and 119 of the mounting member 113. In this modification, in the case of direct attachment of the brake force supplier 95 to the main base frame 11, the brake force supplier 95 may be formed with positioning pins to be fitted in the positioning holes 118 and 119.

In the aforementioned embodiment, the brake force supplier 95 is relatively positioned to the attachment member 90 in such a manner that the positioning pins 914 and 915 formed on the main body 91 of the attachment member 90 are fitted in the cutaways 954 and 955 formed in the brake force supplier 95. Alternatively, as shown in FIG. 9, the main body 91 of the attachment member 90 may be formed with a pair of positioning holes 918 and 919, and the brake force supplier 95 may be formed with a pair of positioning pins 956 and 957 on a peripheral portion thereof opposing to each other with the main body 951 interposed therebetween and on the backside thereof, i.e., on the same side as the driven gear 953 is mounted.

With this arrangement, the brake force supplier 95 can be positioned relative to the attachment member 90 by fitting insertion of the pins 956 and 957 in the holes 918 and 919.

Figure 9:
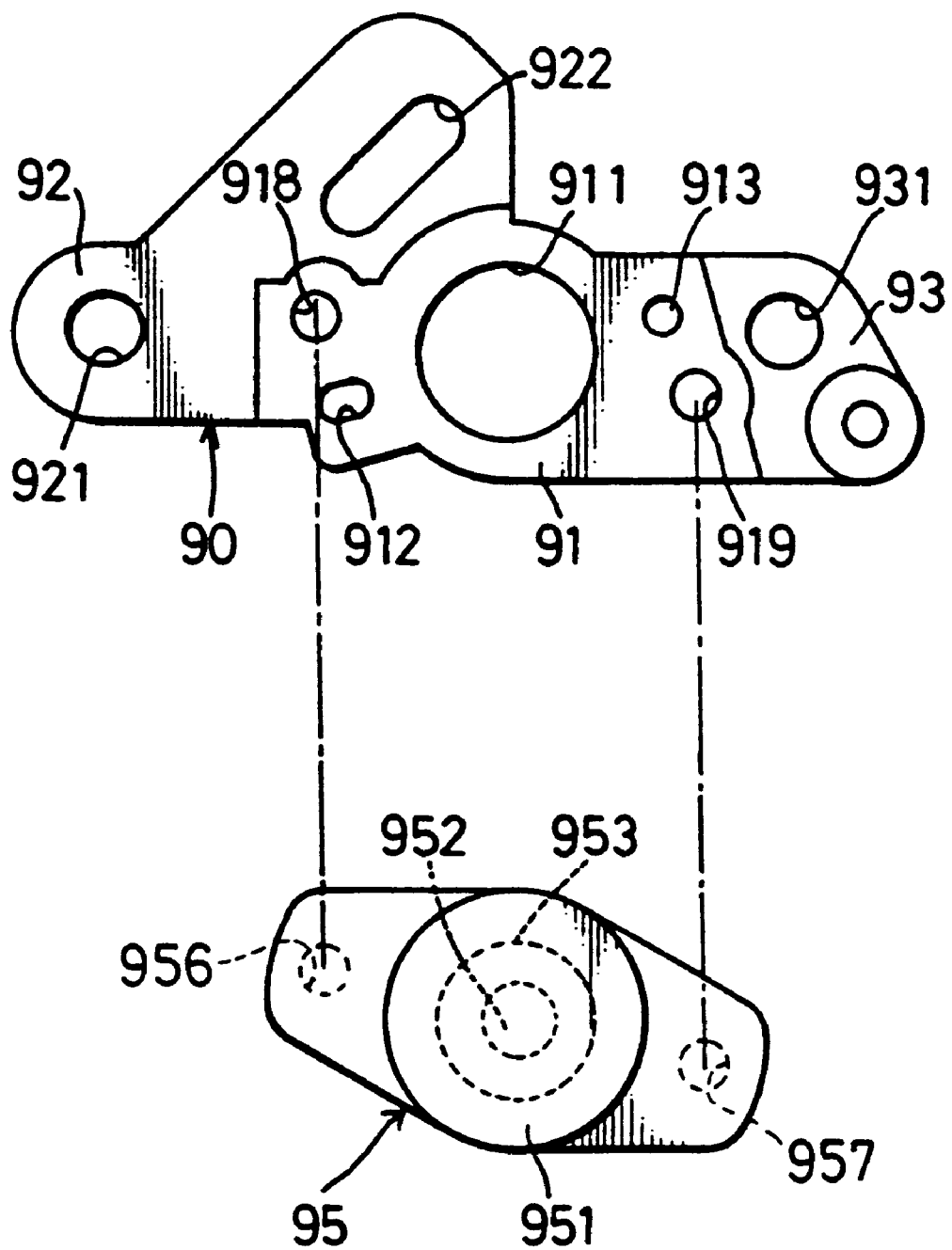
FIG. 9 is a diagram showing a modification of the positioning structure of mounting the brake force supplier on the attachment.

As a further modification, the combination of the arrangement of the modification shown in FIG. 8 with the arrangement of modification shown in FIG. 9 may be adopted.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A positioning structure for positioning a brake force supplier relative to a main base frame of an image forming apparatus having the main base frame, an upper frame openably mounted on the main base frame, and the brake force supplier for applying a brake force to the upper frame during a closing operation thereof; the positioning structure comprises:

an attachment member positioned on the main base frame by first positioning members formed on the main base frame, the attachment member formed with second positioning members;

the brake force supplier positioned on the attachment member by the second positioning members.

2. The positioning structure according to claim 1, wherein the attachment member includes a main body portion for attaching the brake force supplier thereto, and attachment portions attached to the main base frame, and the second positioning members are formed on the main body portion.

3. The positioning structure according to claim 2, wherein each first positioning member includes a positioning pin, and the main body portion of the attachment member is formed with positioning holes therein for positioning the attachment member relative to the main base frame by insertion of the positioning pins in the positioning holes.

4. The positioning structure according to claim 2, wherein each first positioning member includes a positioning hole, and the main body portion of the attachment member is formed with positioning pins for positioning the attachment member relative to the main base frame by insertion of the positioning pins in the positioning holes.

5. The positioning structure according to claim 1, wherein each second positioning member includes a positioning pin, and the brake force supplier is formed with positioning holes in the periphery thereof for positioning the brake force supplier relative to the attachment member by insertion of the positioning pins in the positioning holes.

6. The positioning structure according to claim 1, wherein each second positioning member includes a positioning hole, and the brake force supplier is formed with positioning pins in the periphery thereof for positioning the brake force supplier relative to the attachment member by insertion of the positioning pins in the positioning holes.

7. An image forming apparatus comprising:

a main base frame including first positioning members;

an upper frame openably mounted on the main base frame;

a brake force supplier for applying a brake force to the upper frame during a closing operation thereof; and an attachment member positioned on the main base frame by the first positioning members, the attachment member including second positioning members for positioning the brake force supplier relative thereto by the second positioning members.

8. The image forming apparatus according to claim 7, wherein the attachment member includes a main body portion for attaching the brake force supplier thereto, and attachment portions attached to the main base frame, and the second positioning members are formed on the main body portion.

9. The image forming apparatus according to claim 8, wherein each first positioning member includes a positioning pin, and the main body portion of the attachment member is formed with a positioning holes therein for positioning the attachment member relative to the main base frame by insertion of the positioning pins in the positioning holes.

10. The image forming apparatus according to claim 8, wherein each first positioning member includes a positioning hole, and the main body portion of the attachment member is formed with positioning pins for positioning the attachment member relative to the main base frame by insertion of the positioning pins in the positioning holes.

11. The image forming apparatus according to claim 7, wherein each second positioning member includes a positioning pin, the brake force supplier is formed with positioning holes in the periphery thereof for positioning the brake force supplier relative to the attachment member by insertion of the positioning pins in the positioning holes.

12. The image forming apparatus according to claim 7, wherein each second positioning member includes a positioning hole, and the brake force supplier is formed with positioning pins in the periphery thereof for positioning the brake force supplier relative to the attachment member by insertion of the positioning pins in the positioning holes.

* * * * *